UNITED STATES PATENT OFFICE.

WILLIAM SIMON, OF BALTIMORE, MARYLAND.

PROCESS OF MAKING POTASSIUM BICHROMATE.

SPECIFICATION forming part of Letters Patent No. 366,036, dated July 5, 1887.

Application filed December 2, 1885. Serial No. 184,464. (No specimens.)

*To all whom it may concern:*

Be it known that I, WILLIAM SIMON, a citizen of the United States, residing in the city of Baltimore and State of Maryland, have invented certain new and useful Improvements in the Manufacture of Bichromate of Potash, of which the following is a full and clear description.

My method for the manufacture of bichromate of potassium consists in the conversion of chromate of sodium into bichromate of potassium by the addition of sulphate of potassium and of either hydrochloric or sulphuric acid to a solution of said chromate of sodium, when decomposition takes place, bichromate of potassium being formed, which is separated by crystallization, while the sodium salts (chloride or sulphate of sodium) which are formed may be obtained by boiling down the mother-liquor.

The above process may be carried out in two different ways, as follows:

First way: Chromate of sodium, or a solution of this salt, is converted into bichromate of sodium by the addition of a mineral acid in the well-known way, and then to the solution of bichromate of sodium thus obtained, and also containing a soda salt of the acid employed, (which soda salt may or may not be separated by boiling down to a sufficient strength,) is added sulphate of potassium, when the decomposition takes place, which is represented by the following equation:

$$Na_2Cr_2O_7 + K_2SO_4 = K_2Cr_2O_7 + Na_2SO_4$$
Bichromate of sodium. + Sulphate of potassium. = Bichromate of potassium. + Sulphate of sodium.

Second way: To chromate of sodium, or to a solution of this salt, are added sulphuric acid and sulphate of potassium, when bichromate of potassium separates in crystals and is collected, while sulphate of sodium is obtained by boiling down the mother-liquor and removing this salt, and from which mother-liquor again bichromate of potassium crystallizes on cooling. The decomposition taking place is shown by the following equation:

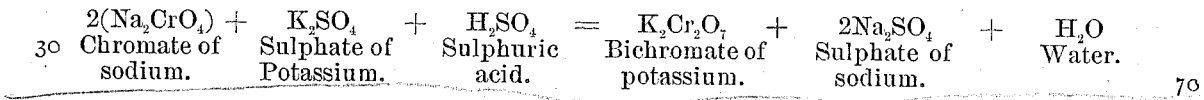

$$2(Na_2CrO_4) + K_2SO_4 + H_2SO_4 = K_2Cr_2O_7 + 2Na_2SO_4 + H_2O$$
Chromate of sodium. + Sulphate of Potassium. + Sulphuric acid. = Bichromate of potassium. + Sulphate of sodium. + Water.

What I claim is—

1. The process of manufacturing bichromate of potassium which consists in decomposing bichromate of sodium by sulphate of potassium, substantially as described.

2. The process of manufacturing bichromate of potassium which consists in decomposing chromate of sodium by sulphate of potassium and sulphuric acid, substantially as described.

WILLIAM SIMON.

Witnesses:
FELIX R. SULLIVAN,
JAMES C. G. UNDUCH,
I. W. KREBS.